United States Patent
Luo et al.

(10) Patent No.: US 10,173,171 B2
(45) Date of Patent: Jan. 8, 2019

(54) DUST REMOVAL AND DESULFURIZATION OF FCC EXHAUST GAS

(71) Applicant: Jiangnan Environmental Protection Group Inc., Grand Cayman (KY)

(72) Inventors: Jing Luo, NanJing (CN); Jun Zhang, NanJing (CN); Yongying Luo, NanJing (CN); Qiang Tan, NanJing (CN); Xiangjun Xu, NanJing (CN)

(73) Assignee: Jiangnan Environmental Protection Group Inc., Grand Cayman OT (KY)

( * ) Notice: Subject to any disclaimer, the term of this patent is extended or adjusted under 35 U.S.C. 154(b) by 0 days.

(21) Appl. No.: 15/938,272

(22) Filed: Mar. 28, 2018

(65) Prior Publication Data

US 2018/0339266 A1   Nov. 29, 2018

Related U.S. Application Data (63) Continuation of application No. 15/618,975, filed on Jun. 9, 2017.

(30) Foreign Application Priority Data

May 25, 2017   (CN) .......................... 2017 1 0379458

(51) Int. Cl.
    *B01D 53/74*   (2006.01)
    *B01D 53/75*   (2006.01)
    (Continued)

(52) U.S. Cl.
    CPC .......... *B01D 53/502* (2013.01); *B01D 47/06* (2013.01); *B01D 53/343* (2013.01); *B01D 53/56* (2013.01);
    (Continued)

(58) Field of Classification Search
    CPC ........ B01D 53/74; B01D 53/75; B01D 53/78; B01D 47/06; B01D 47/12; B01D 2247/00;
    (Continued)

(56) References Cited

U.S. PATENT DOCUMENTS 2,810,627 A   10/1957  Johnstone et al.
3,752,877 A    8/1973  Beavon
(Continued)

FOREIGN PATENT DOCUMENTS

CN   1164480 C    9/2004
CN   2640584 Y    9/2004
(Continued)

OTHER PUBLICATIONS

Google Patents English translation of CN1283346C.
(Continued)

*Primary Examiner* — Timothy C Vanoy
(74) *Attorney, Agent, or Firm* — Weiss & Arons LLP (57) ABSTRACT

Apparatus and methods for denitrification and desulfurization of and dust removal from an FCC tail gas by an ammonia-based process. The apparatus may include a first-stage waste heat recovery system, a denitrification system, a dust removal and desulfurization system, a tail gas exhaust system, and an ammonium sulfate post-processing system. The dust removal and desulfurization system may include a dedusting tower and an absorption tower disposed separately. The top and the bottom of the absorption tower may be connected respectively to the tail gas exhaust system and the ammonium sulfate post-processing system. The absorption tower may include sequentially, from bottom to top, an oxidation section, an absorption section, and a fine particulate control section. The methods may be implemented with the apparatus.

30 Claims, 2 Drawing Sheets

(51) Int. Cl.
  *B01D 53/78* (2006.01)
  *B01D 47/06* (2006.01)
  *B01D 47/12* (2006.01)
  *C10G 11/18* (2006.01)
  *B01D 53/50* (2006.01)
  *B01D 53/56* (2006.01)
  *B01D 53/34* (2006.01)
  *B01D 53/86* (2006.01)
  *B01D 53/96* (2006.01)

(52) U.S. Cl.
  CPC .............. *B01D 53/75* (2013.01); *B01D 53/78* (2013.01); *B01D 53/8628* (2013.01); *B01D 53/96* (2013.01); *C10G 11/18* (2013.01); *B01D 2252/102* (2013.01); *C10G 2300/405* (2013.01)

(58) Field of Classification Search
  CPC ........ B01D 2257/302; B01D 2257/402; B01D 2257/404; B01D 2258/0283; C10G 11/18
  See application file for complete search history.

(56) References Cited

U.S. PATENT DOCUMENTS

| | | | |
|---|---|---|---|
| 3,970,740 A * | 7/1976 | Reeder | B01D 47/00 423/243.08 |
| 3,983,217 A | 9/1976 | Muraki et al. | |
| 4,294,590 A | 10/1981 | Linde et al. | |
| 4,324,776 A | 4/1982 | Kim | |
| 4,378,977 A | 4/1983 | Linde et al. | |
| 4,552,747 A | 11/1985 | Goar | |
| 4,690,807 A | 9/1987 | Saleem | |
| 5,019,361 A | 5/1991 | Hakka | |
| 5,106,607 A | 4/1992 | Chopin et al. | |
| 5,632,967 A | 5/1997 | Nasato | |
| 6,063,352 A | 5/2000 | Risse et al. | |
| 6,066,304 A | 5/2000 | Freetly et al. | |
| 6,139,807 A | 10/2000 | Risse et al. | |
| 6,444,185 B1 | 9/2002 | Nougayrede et al. | |
| 6,508,998 B1 | 1/2003 | Nasato | |
| 6,569,398 B2 | 5/2003 | Fenderson | |
| 6,616,908 B2 | 9/2003 | Watson et al. | |
| 6,776,974 B1 | 8/2004 | Burmaster et al. | |
| 7,351,392 B2 | 4/2008 | Chen et al. | |
| 7,635,408 B2 | 12/2009 | Mak et al. | |
| 7,648,692 B2 | 1/2010 | Chow et al. | |
| 7,754,471 B2 | 7/2010 | Chen et al. | |
| 7,879,135 B2 | 2/2011 | Ravikumar et al. | |
| 7,910,077 B2 | 3/2011 | Chow et al. | |
| 8,178,070 B2 | 5/2012 | Wong et al. | |
| 8,206,669 B2 | 6/2012 | Schaffer et al. | |
| 8,361,432 B2 | 1/2013 | Parekh et al. | |
| 8,444,943 B2 | 5/2013 | Lamar | |
| 8,545,793 B2 | 10/2013 | Thielert | |
| 8,871,176 B2 | 10/2014 | Liu et al. | |
| 8,968,691 B2 * | 3/2015 | Mochizuki | B01D 53/502 422/168 |
| 9,370,745 B2 | 6/2016 | Xu et al. | |
| 2007/0248518 A1 | 10/2007 | Jung et al. | |
| 2009/0004070 A1 | 1/2009 | Chow et al. | |
| 2011/0195008 A1 | 8/2011 | Menzel et al. | |
| 2011/0243822 A1 | 10/2011 | Mortson | |
| 2015/0352489 A1 | 12/2015 | Luo et al. | |

FOREIGN PATENT DOCUMENTS

| | | | |
|---|---|---|---|
| CN | 2640585 Y | 9/2004 | |
| CN | 2668235 Y | 1/2005 | |
| CN | 2746971 Y | 12/2005 | |
| CN | 2746972 Y | 12/2005 | |
| CN | 2746973 Y | 12/2005 | |
| CN | 2754711 Y | 2/2006 | |
| CN | 1251965 C | 4/2006 | |
| CN | 2772609 Y | 4/2006 | |
| CN | 2799059 Y | 7/2006 | |
| CN | 2799060 Y | 7/2006 | |
| CN | 1283346 C | 11/2006 | |
| CN | 1321723 C | 6/2007 | |
| CN | 101085410 A | 12/2007 | |
| CN | 101108301 A | 1/2008 | |
| CN | 201030298 Y | 3/2008 | |
| CN | 201052456 Y | 4/2008 | |
| CN | 100395006 C | 6/2008 | |
| CN | 201109711 Y | 9/2008 | |
| CN | 100428979 C | 10/2008 | |
| CN | 201129965 Y | 10/2008 | |
| CN | 201132102 Y | 10/2008 | |
| CN | 201179415 Y | 1/2009 | |
| CN | 100460045 C | 2/2009 | |
| CN | 100475313 C | 4/2009 | |
| CN | 101422693 A | 5/2009 | |
| CN | 201231130 Y | 5/2009 | |
| CN | 101524620 | 9/2009 | |
| CN | 201320447 Y | 10/2009 | |
| CN | 201333376 Y | 10/2009 | |
| CN | 101575103 A | 11/2009 | |
| CN | 101585511 A | 11/2009 | |
| CN | 201380037 Y | 1/2010 | |
| CN | 201380038 Y | 1/2010 | |
| CN | 201380039 Y | 1/2010 | |
| CN | 201380040 Y | 1/2010 | |
| CN | 100588608 C | 2/2010 | |
| CN | 101642629 A | 2/2010 | |
| CN | 201423237 Y | 3/2010 | |
| CN | 101274750 B | 6/2010 | |
| CN | 201492952 U | 6/2010 | |
| CN | 201529487 U | 7/2010 | |
| CN | 201529488 U | 7/2010 | |
| CN | 201537456 U | 8/2010 | |
| CN | 101274196 B | 12/2010 | |
| CN | 101182926 B | 1/2011 | |
| CN | 101519192 B | 2/2011 | |
| CN | 101579600 B | 4/2011 | |
| CN | 102012034 A | 4/2011 | |
| CN | 101456541 B | 5/2011 | |
| CN | 101576261 B | 5/2011 | |
| CN | 101579602 B | 5/2011 | |
| CN | 102061206 A | 5/2011 | |
| CN | 101274204 B | 6/2011 | |
| CN | 101670231 B | 8/2011 | |
| CN | 201912884 U | 8/2011 | |
| CN | 201912885 U | 8/2011 | |
| CN | 201944861 U | 8/2011 | |
| CN | 201949808 U | 8/2011 | |
| CN | 102205202 A | 10/2011 | |
| CN | 102309920 A * | 1/2012 | ............. B01D 53/90 |
| CN | 102380305 A | 3/2012 | |
| CN | 102381685 A | 3/2012 | |
| CN | 102381686 A | 3/2012 | |
| CN | 101791517 B | 5/2012 | |
| CN | 102451604 A | 5/2012 | |
| CN | 101456540 B | 7/2012 | |
| CN | 101574614 B | 7/2012 | |
| CN | 101637685 B | 7/2012 | |
| CN | 102631827 A | 8/2012 | |
| CN | 202460375 U | 10/2012 | |
| CN | 202460420 U | 10/2012 | |
| CN | 202460438 U | 10/2012 | |
| CN | 101530727 B | 11/2012 | |
| CN | 101955828 B | 11/2012 | |
| CN | 102211762 B | 11/2012 | |
| CN | 101972592 B | 12/2012 | |
| CN | 101934191 B | 1/2013 | |
| CN | 102049186 B | 1/2013 | |
| CN | 202751942 U | 2/2013 | |
| CN | 202754802 U | 2/2013 | |
| CN | 202829575 U | 3/2013 | |
| CN | 101418246 B | 4/2013 | |
| CN | 202912691 U | 5/2013 | |
| CN | 202924730 U | 5/2013 | |
| CN | 202953829 U | 5/2013 | |
| CN | 103212281 | 7/2013 | |

(56) References Cited

FOREIGN PATENT DOCUMENTS

| | | | | |
|---|---|---|---|---|
| CN | 102381687 B | 8/2013 | | |
| CN | 203159221 U | 8/2013 | | |
| CN | 203264545 U | 11/2013 | | |
| CN | 203291675 U | 11/2013 | | |
| CN | 102489140 B | 12/2013 | | |
| CN | 103418223 A | 12/2013 | | |
| CN | 203329558 U | 12/2013 | | |
| CN | 102309920 B | * | 1/2014 | ............ B01D 53/90 |
| CN | 103721553 A | 4/2014 | | |
| CN | 103768919 | 5/2014 | | |
| CN | 203612955 U | 5/2014 | | |
| CN | 102942162 B | 8/2014 | | |
| CN | 203781842 U | 8/2014 | | |
| CN | 102910593 B | 9/2014 | | |
| CN | 102847431 B | 10/2014 | | |
| CN | 103204477 B | 10/2014 | | |
| CN | 103446859 B | 10/2014 | | |
| CN | 104138713 A | 11/2014 | | |
| CN | 103301732 B | 1/2015 | | |
| CN | 103041679 B | 2/2015 | | |
| CN | 103301736 B | 2/2015 | | |
| CN | 104368231 A | 2/2015 | | |
| CN | 204134465 U | 2/2015 | | |
| CN | 204151066 U | 2/2015 | | |
| CN | 102895870 B | 3/2015 | | |
| CN | 102923670 B | 3/2015 | | |
| CN | 204198421 U | 3/2015 | | |
| CN | 103223292 B | 4/2015 | | |
| CN | 104555939 A | 4/2015 | | |
| CN | 204233957 U | 4/2015 | | |
| CN | 103112831 B | 5/2015 | | |
| CN | 204352660 U | 5/2015 | | |
| CN | 103301705 B | 8/2015 | | |
| CN | 103482583 B | 9/2015 | | |
| CN | 104923046 A | 9/2015 | | |
| CN | 104927894 A | 9/2015 | | |
| CN | 104941423 A | 9/2015 | | |
| CN | 104946296 A | 9/2015 | | |
| CN | 105056746 A | 11/2015 | | |
| CN | 103463949 B | 12/2015 | | |
| CN | 105110819 A | 12/2015 | | |
| CN | 105126573 A | 12/2015 | | |
| CN | 104353258 B | 1/2016 | | |
| CN | 104279995 B | 4/2016 | | |
| CN | 205235588 U | 5/2016 | | |
| CN | 205245200 U | 5/2016 | | |
| CN | 205252720 U | 5/2016 | | |
| CN | 205252721 U | 5/2016 | | |
| CN | 205252722 U | 5/2016 | | |
| CN | 205262780 U | 5/2016 | | |
| CN | 103822217 B | 6/2016 | | |
| CN | 105757688 A | 7/2016 | | |
| CN | 104555940 B | 8/2016 | | |
| CN | 105841168 A | 8/2016 | | |
| CN | 104524948 B | 9/2016 | | |
| CN | 205549846 U | 9/2016 | | |
| CN | 205562498 U | 9/2016 | | |
| CN | 103521060 B | 1/2017 | | |
| CN | 103939918 B | 1/2017 | | |
| CN | 104208992 B | 2/2017 | | |
| CN | 104258713 B | 2/2017 | | |
| CN | 104528659 B | 2/2017 | | |
| DE | 3733319 A1 | 9/1989 | | |
| EP | 165609 B1 | 6/1985 | | |
| EP | 212523 A2 | 3/1987 | | |
| JP | S47-043737 | 11/1972 | | |
| WO | WO200507505 A1 | 8/2005 | | |
| WO | WO2005113429 A1 | 12/2005 | | |
| WO | WO2006113935 A2 | 10/2006 | | |
| WO | WO2012152919 A1 | 11/2012 | | |

OTHER PUBLICATIONS

Google Patents English translation of CN2640585Y.
Google Patents English translation of CN2772609Y.
Google Patents English translation of CN100428979C.
Google Patents English translation of CN201912885U.
Google Patents English translation of CN10322392A.
"Introduction to FGD for China Shenhua Coal to Liquid(CTL) Project," Jiangnan Environmental Technology, Inc., 19$^{th}$ Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19$^{th}$ Annual Electric Power Conference and Exhibition, Apr. 13, 2017, Chicago, Illinois.
Office Action issued in U.S. Appl. No. 14/829,905 dated Nov. 16, 2015.
Office Action issued in U.S. Appl. No. 14/829,905 dated Feb. 29, 2016.
Office Action issued in U.S. Appl. No. 14/829,909 dated Apr. 15, 2016.
Office Action issued in U.S. Appl. No. 14/829,909 dated Dec. 14, 2016.
Office Action issued in U.S. Appl. No. 14/829,909 dated Feb. 14, 2017.
International Search Report issued for International Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
Office Action issued by the Japanese Intellectual Property Office in Japanese Application No. 2017-123088, dated Apr. 16, 2018.
Written Opinion of the International Searching Authority, dated Oct. 23, 2018.

* cited by examiner

FIG. 1

FIG. 2

DUST REMOVAL AND DESULFURIZATION OF FCC EXHAUST GAS

This application claims priority under 35 U.S.C. § 119 of Chinese Patent Application No. 201710379458.6, filed on May 25, 2017, which is hereby incorporated in its entirety herein.

TECHNICAL FIELD

The present invention relates to the field of environmental protection technologies, and in particular to a method and an apparatus for denitrification and desulfurization of and dust removal from a fluid catalytic cracking (hereinafter, "FCC") tail gas by an ammonia-based process.

BACKGROUND $SO_2$, $NO_x$, and dust are main pollutants in the atmosphere and are a significant source of smog. With the increasing total industrial pollution load and the limited environmental receptivity, the emission standards need to be further improved, to reduce the concentration of emitted pollutants. FCC tail gas is characterized by large fine particulate level (particulates with a size of 0-10 μm account for 50% or more) and high $SO_2$ concentration (300-4500 mg/m$^3$). Moreover, the dust level fluctuates greatly; particularly when the catalyst loss occurs in a regenerator during the regular "soot blowing" process and in an extreme state of a high-temperature operation, the dust level is increased dramatically. In addition to silicon, aluminum and other metal elements, the dust may also contain nickel, vanadium or other heavy metal elements, thus affecting the quality of by-products, and affecting the recycling of sulfur. All these factors have increased the difficulty in effective management of tail gas pollution occurring during catalyst regeneration of a catalytic cracking unit.

At present, dust removal from and desulfurization of the FCC tail gas may rely on the use of wet washing technology; however, the investment, operation and maintenance costs are high, and the construction period of the system is long. Moreover, these technical methods also have the problems such as high consumption of lye, large volume of waste water and others. The existing sodium process is a disposable process, in which the desulfurization and dust removal operations have no need to be separated; however, high salt waste water is required to be treated, secondary pollution may be caused, and a large amount of catalyst may enter the washing liquid under the operating condition of catalyst loss, which may increase the treatment load of the waste solid, and waste the catalyst, thus affecting the long-term stable operation of the system.

Chinese Patent Application No. CN 104941423A disclosed a system for denitrification and desulfurization of and dust removal from an FCC regenerative tail gas by an ammonia-based process on Sep. 30, 2015. The application discloses introducing the high-temperature tail gas containing the catalyst dust produced during the catalyst regeneration of a catalytic cracking unit to a waste heat recovery boiler I, where the temperature of the tail gas is reduced to 280-430° C., and the heat of the tail gas is utilized by the waste heat recovery boiler I to produce steam for output; entering the tail gas at 280-430° C. into a denitrification system for denitrification; after adequate reaction on the surface of the denitrification catalyst in the denitrification reactor, entering the tail gas into a waste heat recovery boiler II via a tail gas vent; removing the sulfur dioxide and nitrogen oxide in the tail gas by reacting with ammonia, with ammonium sulfate being produced as a by-product, and removing the catalyst dust in the tail gas at the same time, to obtain a cleaned gas that is discharged up to standard.

The application discloses integrated desulfurization and dust removal technology by an ammonia-based process. During the long-term operation and practice, where the same absorption liquid is used for dust removal and desulfurization, the absorption liquid containing ammonium sulfate is difficult to separate from the dust because the particle size of the catalyst dust is small. The system necessitates that the dust level in the tail gas at the inlet is 30-800 mg/Nm$^3$. The dust removal and the desulfurization are carried out at the same time, and there is mutual interference, thus affecting the long-term stable operation of the apparatus. Especially when the dust level in the tail gas at the inlet is as high as 5000 mg/Nm$^3$, and the total amount exceeds 2 tons under an accident condition, ingredients entering the circulating absorption liquid will affect the absorption liquid, and the desulfurization and dust removal efficiencies, and the absorption liquid cannot be effectively separated from the dust, thus affecting the quality of the product ammonium sulfate.

It would therefore be desirable to provide improved apparatus and methods for recovery-type deep denitrification, desulfurization and dust removal to overcome shortcomings in the prior art.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

REFERENCE NUMERALS

Figure 1:
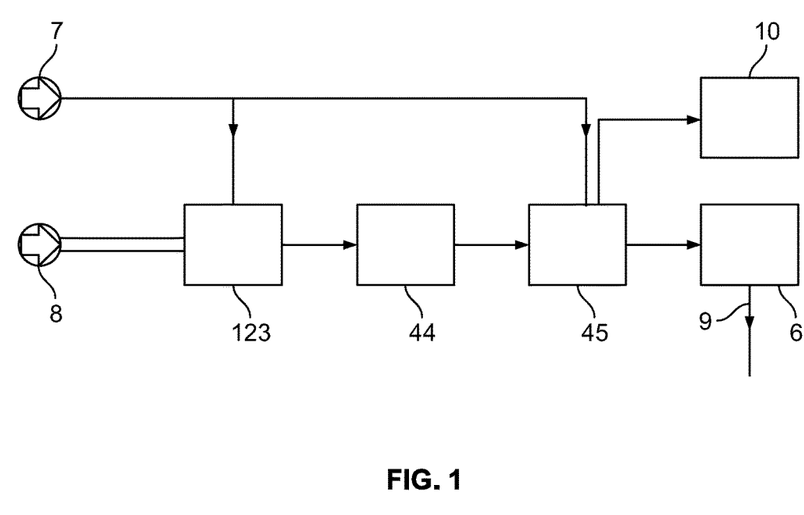
FIG. 1 is a schematic illustration of apparatus in accordance with the principles of the invention.
Figure 2:
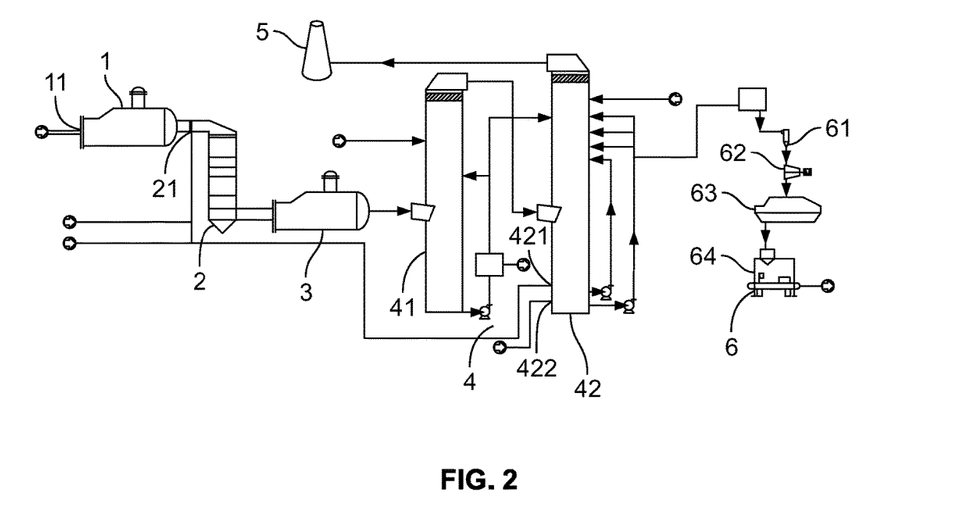
FIG. 2 is a schematic illustration of apparatus in accordance with the principles of the invention.

In FIG. 1:
6: ammonium sulfate post-processing system;
7: ammonia;
8: FCC tail gas;
9: ammonium sulfate;
10: cleaned tail gas;
123: denitrification and waste heat recovery system;
44: dedusting system;
45: desulfurization system;
In FIG. 2:
1: first-stage waste heat recovery system;
2: denitrification system;
3: second-stage waste heat recovery system;
4: dust removal and desulfurization system;
5: tail gas exhaust system;
6: ammonium sulfate post-processing system;
11: inlet for FCC tail gas;
21: feed port for denitrification reducing agent;
41: dedusting tower;
42: absorption tower;
421: inlet for ammonia-containing absorbent;
422: inlet for air as oxidant;

61: evaporation and crystallization device;
62: cyclone;
63: centrifuge;
64: dryer;

The drawings are exemplifications of the principles of the invention and are not intended to limit the invention to the particular embodiments illustrated.

DETAILED DESCRIPTION

Definitions

"Ammonia-Bearing Liquid" means a liquid comprising at least one ammonia or amine based compound, including but not limited to ammonium salts, ammonium ions (NH4+), ammonium sulfate, ammonium sulfite, and any combination thereof. The liquid may be water.

"Ammonia recovery" means that fraction or percentage of ammonia added to a gas cleaning process that is subsequently captured and extracted from the process.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"Exhaust" means a flow of gas exiting an industrial or chemical process. It includes but is not limited to flue gas, tail gas, exhaust gases from ovens, furnaces, boilers, and/or generators. It may comprise combustion products derived from the combustion of air and flammable material, residual material from chemical processes, which may include water, nitrogen, and pollutants, such as particulate matter, soot, carbon monoxide, nitrogen oxides, and sulfur oxides. The exhaust of one process may be a gaseous input to another process.

"Oxidation Rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

"Spray Coverage" is a divergence of spray from a nozzle or an array of nozzles. The greater is the divergence, the greater is the spray coverage.

"Sulfur Oxides or $SO_x$" means a chemical species containing sulfur and oxygen. It includes compounds such as sulfur monoxide (SO), sulfur dioxide ($SO_2$), sulfur trioxide ($SO_3$), higher sulfur oxides ($SO_3$ and $SO_4$ and polymeric condensates of them), disulfur monoxide ($S_2O$), disulfur dioxide ($S_2O_2$), and lower sulfur oxides ($S_7O_2$, $S_6O_2$, and $S_nO_x$, where n and x are any possible stoichiometric numerical values).

"$NO_x$" means a chemical species containing nitrogen and oxygen.

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley & Sons, Inc.) shall control, if provided therein.

Apparatus and methods for using ammonia to treat fluid catalytic cracking tail-gas are provided.

The apparatus and methods may include an oxidation section, an absorption section and a fine particulate control section in the absorption tower. Functions of the oxidation section, absorption section and fine particulate control section in the absorption tower may be similar to those described in Chinese Invention Patent Application Nos. CN103301705B, entitled "Apparatus and method for controlling fine particulates in tail gas for desulfurization", and CN104524948B, entitled "Ultra-low discharge method for integrated ultrasonic desulfurization and dust removal," which are hereby incorporated by reference herein in their entireties, filed by the present applicants.

The apparatus and methods may operate stably for a long period of time. Ammonium sulfate by-product obtained from the apparatus and methods may have high quality, high desulfurization rate, high denitrification rate, and high dust removal rate. Cleaned tail gas may meet the requirement as specified by GB31570-2015 "Emission standard of pollutants for petroleum refining industry".

The apparatus and methods may include dedusting by washing. The washing may include washing with a liquid. The liquid may include water. The apparatus and methods may include desulfurization by an ammonia-based process. Dedusting and desulfurization may be carried out in 2 separated towers. 80% or more dust may be removed in the dedusting tower. Dedusting in the dedusting tower may lead to high quality reclaimed ammonium sulfate product. Dedusting in the dedusting tower may lead to a desirable final dust emission index. The absorption tower may be a tower that does not have a cooling and washing section. The cooling and washing section may be omitted because of heat removal prior to entry into the absorption tower.

The apparatus may include a flow-through heat-exchanger in thermal communication with a flow that includes the tail-gas. The heat exchanger may include a liquid coolant that is materially isolated from the flow. The apparatus may include, downstream, along the flow, from the heat-exchanger, a dust-removal vessel. The dust removal vessel may include a washing-liquid spray layer that is configured to spray washing liquid against the flow to remove dust from the flow. The apparatus may include, downstream from the dust-removal vessel, a sulfur-dioxide absorption vessel. The sulfur-dioxide absorption vessel may support a liquid circuit. The liquid circuit may be configured to provide an ammonia-bearing liquid to a sprayer that is directed against the flow. The liquid circuit may be configured to recirculate the liquid, after passing through the sprayer, to the sprayer.

The sulfur dioxide absorption vessel may include a desulfurization tower. The desulfurization tower may include a sulfur dioxide absorption section. The desulfurization tower may include, downstream from the sulfur dioxide absorption section, a fine particulate removal section.

The fine particulate removal section may include a washing layer. The washing layer may include first sprayers configured to spray recycled dilute ammonium sulfate solution against the flow. The washing layer may include, downstream from the first sprayers, second sprayers configured to spray recycled dilute ammonium sulfate solution against the flow.

The fine particulate removal section may include, downstream from the washing layer, a first demister. The fine particulate removal section may include, downstream from the first demister, a second demister.

In the washing layer, in operation, a ratio of sprayed solution to flow gas in a region between the first sprayers and the second sprayers may be a ratio that is not less than 1.1 L/m$^3$.

In the washing layer, in operation, a spray coverage rate of the first sprayers may be a rate that is not less than 120%.

In the washing layer, in operation, the spray coverage rate may be a rate that is not less than 300%.

The sulfur dioxide absorption tower may be a sulfur dioxide absorption tower that does not have a flow-cooling section.

The apparatus may include a denitrification system. The denitrification system may be configured to remove nitrogen from the flow. The denitrification system may be disposed upstream along the flow, from the heat exchanger. The denitrification system may be disposed upstream along the flow from the vessel.

The denitrification system may be disposed downstream along the flow, from the heat exchanger.

The dust-removal vessel may be disposed downstream from the denitrification system.

The apparatus may include a waste-heat recovery system. The waste-heat recovery system may be disposed downstream from the denitrification system. The waste-heat recovery system may be configured to remove heat from the flow. The waste-heat recovery system may include a liquid coolant. The coolant may be materially isolated from the flow.

The denitrification system may include a selective catalytic reduction reactor. The reactor may have an ammonia injection grid at an inlet for the flow. The reactor may have a flow rectifier configured to rectify the flow.

The dust removal vessel may include, transverse to a direction of the flow, first sprayers in a first washing-liquid spray layer. The dust removal vessel may include, transverse to a direction of the flow, below the first layer, second sprayers in a second washing-liquid spray layer. The sprayers may be configured to direct washing-liquid against the flow.

The first washing-liquid spray layer may be configured to dispense washing-liquid such that between the first and second washing-liquid layers washing-liquid is sprayed at a rate of 1.1 L washing-liquid per m3 flow moving up the tower. The first washing-liquid spray layer may be configured to provide a spray coverage rate that is not less than 120%. The total spray coverage rate of washing-liquid spray layers in the dedusting tower may be a rate that is not less than 200%.

The dust removal vessel may include, transverse to the flow, a demister.

The demister may include a baffle-type demister.
The demister may include a roof-ridge type demister.
The demister may include a wire mesh type demister.

The apparatus may include an evaporator that is configured to dewater ammonium sulfate in a feed. The feed may be a feed that is generated by the sulfur-absorption vessel. The evaporator may produce from the ammonium sulfate a slurry.

The reclamation system may be configured to pass the slurry through a cyclone.

The reclamation system may be configured to pass the slurry through a centrifuge.

The reclamation system may be configured to pass the slurry through a dryer.

The reclamation system may be configured to pass the slurry to a packaging machine.

The reclamation system may be configured to pass the slurry through, in order, a cyclone, a centrifuge a dryer, and a packaging machine.

The methods may include recovering in an indirect-contact heat exchanger heat from a flow that includes the tail-gas so that the temperature of the flow is reduced to 250-350° C. The methods may include after the recovering removing dust from the flow in a first vessel. The methods may include after the removing dust removing sulfur dioxide from the flow in a second vessel.

The methods may include after the removing sulfur dioxide: a first washing the flow by spraying recycled dilute ammonium sulfate solution against the flow at a first location; again washing the flow by spraying recycled dilute ammonium sulfate solution against the flow at a second location downstream from the first location; a first demisting the flow at a third location downstream from the second location; and again demisting the flow at a fourth location downstream from the third location.

The first washing may provide a ratio of sprayed solution to flow gas in a region between the first and second location that is not less than 1.1 L/m$^3$.

The first washing may produce a spray coverage rate not less than 120%.

The first washing may produce a spray coverage rate not less than 300%.

The removing dust may include removing no less than 80% of dust that enters the first vessel in the flow.

The methods may include treating the flow, in the second vessel, with ammonia to produce ammonium sulfate; and adding heat to the ammonium sulfate with an evaporator to thicken the ammonium sulfate.

The methods may include, at an inlet to the first vessel, receiving the flow when the flow has a temperature in the range 250-350° C.

The methods may include, at an inlet to the first vessel, receiving the flow when the flow has a temperature in the range 140 to 220° C.

The methods may include after the recovering heat, and before the removing dust, removing nitrogen oxides from the flow.

The removing sulfur dioxide may include treating the flow with ammonia, the method further comprising collecting ammonium sulfate that is produced by the treating.

The methods may include, after the removing nitrogen oxides, recovering other heat from the flow. The other heat may be removed by a second-stage waste heat recovery system.

The methods may include, prior to the recovering heat, receiving the flow in a state in which the flow has a temperature in the range 580 to 950° C.

The methods may include, prior to the recovering heat, receiving the flow in a state in which the flow has a NO$_x$ concentration in the range 100 to 1200 mg/Nm$^3$.

The methods may include, prior to the recovering heat, receiving the flow in a state in which the flow has an SO$_2$ concentration in the range 200 to 30,000 mg/Nm$^3$.

The methods may include, prior to the recovering heat, receiving the flow in a state in which the flow has a dust level in the range 50 to 10,000 mg/Nm$^3$. The flow may have a dust level greater than 4,500 mg/Nm$^3$.

The methods may include, prior to the recovering heat, receiving the flow in a state in which the flow has a temperature in the range 600 to 670° C.

The methods may include, prior to the recovering heat, receiving the flow in a state in which the flow has a $NO_x$ concentration in the range 250 to 800 $mg/Nm^3$.

The methods may include, prior to the recovering heat, receiving the flow in a state in which the flow has an $SO_2$ concentration in the range 500 to 5,000 $mg/Nm^3$.

The methods may include, prior to recovering heat, receiving the flow in a state in which the flow has a dust level in the range 100 to 300 $mg/Nm^3$.

The methods may include, after the recovering other heat, and before removing dust: discharging the flow from a second-stage waste heat recovery system in a state in which the flow has a temperature in the range 140 to 220° C.; and producing from the other heat: low-pressure steam in the range 0.3 to 0.8 MPa from tail-gas heat; and preheated soft water.

The removing sulfur dioxide may include collecting a sulfur-dioxide-absorption reflux liquid at a bottom of the second vessel. The removing sulfur dioxide may include feeding a first aliquot of the absorption liquid to an ammonium sulfate post-processing system. The post-processing system may include an ammonium sulfate reclamation system. The removing sulfur dioxide may include oxidizing a second aliquot of the absorption liquid using an oxygen-containing gas. The removing sulfur dioxide may include adding to the second aliquot an ammonia-containing absorbent. The removing sulfur dioxide may include delivering the second aliquot to sprayers in an absorption section of the absorption tower.

The oxygen-containing gas may include air.

The ammonia-containing absorbent may include aqueous ammonia. The aqueous ammonia may be 10-25% ammonia by weight.

The ammonia-containing absorbent may include anhydrous ammonia.

In the delivering, the second aliquot may be in the range 75-98% by weight of the total absorption liquid delivered to the sprayers.

The methods may include:

(1) entering the FCC tail gas sequentially into the first-stage waste heat recovery system and the denitrification system for cooling and denitrification respectively, in which the temperature of the tail gas is reduced to 250-350° C.;

(2) after treatment in the denitrification system, entering the discharged FCC tail gas into the dust removal and desulfurization system, for dust removal in the dedusting tower and desulfurization in the absorption tower respectively; and, after treatment in the denitrification system, further recovering heat from the discharged FCC tail gas in the second-stage waste heat recovery system, and then entering the discharged FCC tail gas into the dust removal and desulfurization system; and (3) discharging the cleaned tail gas after desulfurization via the tail gas exhaust system, and collecting the by-product ammonium sulfate in the ammonium sulfate post-processing system.

The temperature of the FCC tail gas entering the first-stage waste heat recovery system may be in the range 580 to 950° C., the $NO_x$ concentration may be in the range 100 to 1200 $mg/Nm^3$, the $SO_2$ concentration may be in the range 200 to 30000 $mg/Nm^3$, and the total dust level may be in the range 50 to 10000 $mg/Nm^3$; and the temperature of the FCC tail gas entering the first-stage waste heat recovery system may be in the range 600 to 670° C., the $NO_x$ concentration may be in the range 250 to 800 $mg/Nm^3$, the $SO_2$ concentration may be in the range 500 to 5000 $mg/Nm^3$, and the total dust level may be in the range 100 to 300 $mg/Nm^3$.

The temperature of the FCC tail gas after being cooled in the second-stage waste heat recovery system in Step (2) may be in the range 140 to 220° C. The FCC tail gas discharged after the treatment in the second-stage waste heat recovery system may be fed into the dust removal and desulfurization system. The second-stage waste heat recovery system may cool the FCC tail gas in such a manner that a low-pressure steam of 0.3 to 0.8 MPa, preheated soft water, or both, are produced as by-products.

During the desulfurization process, a bottom absorption liquid may be collected at the bottom of the absorption tower, a part of the bottom absorption liquid may be fed to the ammonium sulfate post-processing system. A different part of the bottom absorption liquid may be oxidized with an oxygen-containing gas, replenished with an ammonia-containing absorbent, and then recycled to the absorption section of the absorption tower. The oxygen-containing gas may be air; the ammonia-containing absorbent may be aqueous ammonia of 10-25% by weight and/or anhydrous ammonia. The bottom absorption liquid recycled to the absorption section may account for 75-98% by weight of the total bottom absorption liquid.

The apparatus may include a first-stage waste heat recovery system, a denitrification system, a dust removal and desulfurization system, a tail gas exhaust system, and an ammonium sulfate post-processing system. The denitrification system may have a feed port for a denitrification reducing agent provided thereon. The dust removal and desulfurization system may include a dedusting tower and an absorption tower disposed separately. The top and the bottom of the absorption tower may be connected respectively to the tail gas exhaust system and the ammonium sulfate post-processing system. The dedusting tower may be provided with two or more layers of washing liquid sprayers, and one or more layer of demisters disposed above the washing liquid sprayers in the dedusting tower. The absorption tower may include, sequentially, from bottom to top, an oxidation section, an absorption section, and a fine particulate control section. The absorption section may be provided with two or more layers of sprayers. The fine particulate control section may be provided with one to four evenly spaced washing layers that spray dilute ammonium sulfate solution.

The first-stage waste heat recovery system, the denitrification system, the dedusting tower, and the absorption tower may be connected in sequence.

The apparatus may include or involve a second-stage waste heat recovery system, where the first-stage waste heat recovery system, the denitrification system, the second-stage waste heat recovery system, the dedusting tower, and the absorption tower may be connected in sequence.

The denitrification system may include a selective catalytic reduction (SCR) reactor. A rectifier may be provided in an upper part of the SCR reactor, and an ammonia injection grid may be provided at an inlet for the FCC tail gas of the SCR reactor.

In some embodiments, 2 to 5 or more layers of washing liquid sprayers may be provided in the dedusting tower, in which the liquid to gas ratio between each layer of the washing liquid sprayers is not less than 1.1 $L/m^3$, the spray coverage rate is not less than 120%, and the total spray coverage rate of the dedusting tower is not less than 200%. The dedusting tower may include 1 to 5 or more layers of demisters.

The demister of the dedusting tower may be one or more of a baffle demister, a roof type demister, and a wire mesh demister.

The bottom of the dedusting tower may be connected with a washing circulation pump, which may be connected to a filtering system. The filtering system may be connected respectively to the top of the dedusting tower and the absorption tower. An inlet for process water to the dedusting tower may be provided at an upper portion of the dedusting tower.

Fresh process water or evaporated condensed water may be added to the dedusting tower via the inlet for process water to the dedusting tower, and may enter a circulating washing liquid. A part of the circulating washing liquid may pass through the filtering system and may enter the absorption tower.

Absorption spray liquid may be collected in the oxidation section, and oxidized with air. Most of the slurry may be recycled and, a part of the slurry may enter the ammonium sulfate post-processing system, in which a product ammonium sulfate may be obtained. The slurry for recycling and the slurry entering the ammonium sulfate post-processing system for evaporation and recrystallization may be drawn from different positions of the oxidation section. The oxidation section may include 3 to 8 or more layers of gas-liquid dispersion enhancers.

The absorption tower may include 2 to 4 or more layers of sprayers in the absorption section, in which the liquid to gas ratio between each layer of the sprayers in the absorption section may be a ratio that is not less than 1.1 L/m$^3$, the spray coverage rate may be a rate that is not less than 120%, and the total spray coverage rate of the absorption section may be a rate that is not less than 300%.

One or more layers of demisters may be provided above the sprayers in the absorption section. The absorption section may include 1 to 5 or more layers of demisters.

The demister may include one or more of a baffle demister, a roof type demister, and a wire mesh demister.

The washing layer may be provided with two or more layers of sprayers in the washing layer. Two or more layers of demisters may be provided above the sprayers in the washing layer, in which the liquid to gas ratio between each layer of the sprayers in the washing layer may be a ratio that is not less than 1.1 L/m$^3$, the spray coverage rate may be a rate that is not less than 120%, and the total spray coverage rate of the fine particulate control section may be a rate that is not less than 300%. The washing layer may include 1 to 4 or more layers of sprayers. The washing layer may include 1 to 5 or more layers of demisters.

The demister of the washing layer may include one or more of a baffle demister, a roof type demister, and a wire mesh demister.

The bottom of the absorption tower may be connected with one or more absorption circulation pumps. The absorption section of the absorption tower may include an inlet for absorption spray liquid. Two absorption circulation pumps may be present. Several branches of conduit may run from one of the pumps respectively to the inlet for the absorption spray liquid and the ammonium sulfate post-processing system. The other absorption circulation pump may be directly connected to the inlet for the absorption spray liquid. An inlet for process water to the absorption tower may be provided at an upper portion of the absorption tower. An inlet for an ammonia-containing absorbent and an inlet for air as oxidant may be provided at a lower portion of the absorption tower.

Fresh process water or evaporated condensed water may be added to the absorption tower via an inlet for process water to the absorption tower.

After sulfur dioxide is absorbed in the absorption section, the FCC tail gas enters the fine particulate control section, and may be cyclically or repeatedly washed with dilute ammonium sulfate solution to absorb fine particulates (including fine particulates in dust entrained in the FCC tail gas, escaped ammonia, and aerosol). The size of the fine particulates may be ≤1 μm.

The tail gas exhaust system is may be disposed lateral to or on the top of the desulfurization unit. The tail gas exhaust system may include a tail gas exhaust chimney when disposed on the top of the desulfurization unit.

The ammonium sulfate post-processing system includes an evaporation and crystallization device, a cyclone, a centrifuge, a dryer, and a packaging machine connected in sequence, in which the evaporation and crystallization device is connected to the absorption tower.

A shell, internals, and pipes of the dedusting tower, the absorption tower, and the evaporation and crystallization device may include a corrosion resistant material. The material may include one or more of a stainless-steel material of Grade 022Cr$_{17}$Ni$_{12}$Mo$_2$, a dual-phase steel material of Grade 00Cr$_{22}$Ni$_5$Mo$_3$N, a dual-phase steel material of Grade 00Cr$_{25}$Ni$_6$Mo$_2$N, a titanium-based material, and Q235B steel lined with epoxy glass flakes.

An outlet of the first-stage waste heat recovery boiler may be connected to a gas inlet of the denitrification system. An outlet of the denitrification system may be connected to the second-stage waste heat recovery system.

The methods may include:

(1) entering the FCC tail gas sequentially into the first-stage waste heat recovery system and the denitrification system for cooling and denitrification respectively, in which the temperature of the tail gas is reduced to 250-350° C.;

(2) after treatment in the denitrification system, entering the discharged FCC tail gas into the dust removal and desulfurization system after passing through the second-stage waste heat recovery system, for dust removal in the dedusting tower and desulfurization in the absorption tower respectively; and (3) discharging the cleaned tail gas after desulfurization via the tail gas exhaust system, and collecting the by-product ammonium sulfate in the ammonium sulfate post-processing system.

The temperature of the FCC tail gas entering the first-stage waste heat recovery system may be in the range 580 to 950° C., the NO$_x$ concentration may be in the range 100 to 1200 mg/Nm$^3$, the SO$_2$ concentration may be in the range 200 to 30000 mg/Nm$^3$, and the total dust level may be in the range 50 to 10000 mg/Nm$^3$. The temperature of the FCC tail gas entering the first-stage waste heat recovery system may be in the range 600 to 670° C., the NO$_x$ concentration may be in the range 250 to 800 mg/Nm$^3$, the SO$_2$ concentration may be in the range 500 to 5000 mg/Nm$^3$, and the total dust level may be in the range 100 to 300 mg/Nm$^3$.

The denitrification in Step (1) is may be performed using a selective catalytic reduction (SCR) process or a selective non-catalytic reduction (SNCR) process. The reducing agent used during denitrification may include ammonia, urea or both.

The temperature of the FCC tail gas after being further cooled in the second-stage waste heat recovery system in Step (1) may be in the range 140 to 220° C.

The second-stage waste heat recovery system may be employed for further cooling the FCC tail gas. In some embodiments, the second-stage waste heat recovery system may be omitted. When the second-stage waste heat recovery system is present, FCC tail gas discharged after the treatment in the second-stage waste heat recovery system may be fed into the dust removal and desulfurization system. The FCC tail gas may be cooled by the second-stage waste heat recovery system in such a manner that a low-pressure steam of 0.3 to 0.8 MPa and a preheated soft water, or both, are produced as by-products.

During the desulfurization process in Step (2), a bottom absorption liquid may be collected at the bottom of the absorption tower, a part of which is fed to the ammonium sulfate post-processing system, and another part of which is oxidized with an oxygen-containing gas, replenished with an ammonia-containing absorbent, and then recycled to the absorption section of the absorption tower.

The oxygen-containing gas may include air.

The ammonia-containing absorbent may include aqueous ammonia of 10-25% by weight and/or liquid ammonia.

Bottom absorption liquid recycled to the absorption section may account for 75-98% by weight of the total bottom absorption liquid.

In the cleaned tail gas obtained by the methods, the $NO_x$ concentration may be ≤100 mg/$Nm^3$, the $SO_2$ concentration may be ≤50 mg/$Nm^3$, the total dust level may be ≤20 mg/$Nm^3$, and the dust removal efficiency may be an efficiency that is not less than 80%.

By-product ammonium sulfate obtained from the methods may meet the requirement as specified by GB535-1995.

The reagents and starting materials used in the apparatus and methods may be commercially available.

Example

The Example is provided to illustrate the apparatus and methods.

In GB535-1995, the parameters required for ammonium sulfate of the first grade are: N content ≥21%, water content ≤0.3%, and free acid content ≤0.05%.

In the Example below, the process flow is as follows. An FCC tail gas 8 enters a denitrification and waste water recovery system 123, for the purpose of denitrification under the action of ammonia 7. The FCC tail gas after denitrification enters a dedusting system 44, and then enters a desulfurization system 45 for further desulfurization under the action of ammonia 7. The cleaned tail gas 10 after desulfurization is discharged via a tail gas processing system, and the remaining circulating liquid enters an ammonium sulfate post-processing system 6, where ammonium sulfate 9 is obtained. The specific process is as shown in FIG. 1.

The Example relates to apparatus and methods for denitrification and desulfurization of and dust removal from an FCC tail gas by an ammonia-based process that has a processing capacity of 100,0000 tons/year. The apparatus includes first-stage waste heat recovery system 1, denitrification system 2, second-stage waste heat recovery system 3, dust removal and desulfurization system 4, tail gas exhaust system 5, and ammonium sulfate post-processing system 6. First-stage waste heat recovery system 1 has inlet 11 of the FCC tail gas provided thereon. Denitrification system 2 is connected to the first-stage waste heat recovery system 1, and has feed port 21 of a denitrification reducing agent thereon. Second-stage waste heat recovery system 3 is connected to denitrification system 2. Dust removal and desulfurization system 4 includes a dedusting unit and a desulfurization unit disposed separately. In the Example, the dedusting unit is dedusting tower 41 connected to second-stage waste heat recovery system 3; and the desulfurization unit is an absorption tower 42 connected to the dedusting tower 41 and also to the tail gas exhaust system 5 and ammonium sulfate post-processing system 6 respectively. Absorption tower 42 has an inlet 421 for an ammonia-containing absorbent and an inlet 422 for air as oxidant provided thereon, as shown in FIG. 2.

In the Example, the dedusting tower is includes 3 layers of washing liquid sprayer, where the liquid to gas ratio between each layer of the washing liquid sprayers is 1.5 L/$m^3$, the spray coverage rate of each single layer is 140%, and the total spray coverage rate of the dedusting tower is not less than 400%. The dedusting tower is provided with 2 layers of demisters in an upper part of the dedusting tower, which are baffle and roof type demisters. The dust removal efficiency of the dedusting tower is not less than 80%. The solid-containing washing liquid obtained in the dedusting tower is fed to a filtering system for solid removal, and the washing liquid removed of the solid is recycled for washing the FCC tail gas.

In the Example, an oxidation tank is provided at the bottom of absorption tower 42, and 3 layers of absorption liquid sprayers are provided in an absorption section above the inlet for the tail gas, where the liquid to gas ratio between each layer of the washing liquid sprayers is 1.25 L/$m^3$, the spray coverage rate of each single layer is 130%, and the total spray coverage rate of the dedusting tower is 320%. The absorption liquids of different oxidation rates are drawn from 2 different positions of the oxidation tank at the bottom of the absorption tower, one of which is recycled for absorption by an absorption circulation pump, and the other of which is fed to an evaporation and crystallization system. A fine particulate control section is provided above the absorption section, and the fine particulate control section includes 2 layers of demisters provided above a sprayer layer in a washing layer, and the demisters in the washing layer are roof type and wire mesh demisters.

In the Example, ammonium sulfate post-processing system 6 includes an evaporation and crystallization device 61, a cyclone 62, a centrifuge 63, a dryer 64, and a packaging machine 65 connected in sequence.

In the Example, the shell, the internals, and the pipes of the dedusting tower, the absorption tower, and the evaporation and crystallization device are all made with a stainless-steel material of Grade $022Cr_{17}Ni_{12}Mo_2$.

The method of the Example includes:

(1) entering the FCC tail gas, where the flow rate is 262000 $Nm^3$/h, the temperature of the FCC tail gas is 600-650° C., the dust level in the tail gas is 200 mg/$Nm^3$ in a normal case, the $SO_2$ concentration is 3550 mg/$Nm^3$, the $NO_x$ concentration is 350 mg/$Nm^3$, the dust level is 7500 mg/$Nm^3$ under the operating condition of catalyst loss, the duration of catalyst loss is 2.5 h, and the catalyst lost is 4.91 t, into the first-stage waste heat recovery system where the temperature of the FCC tail gas is reduced to 335° C., and the heat of the tail gas is utilized by the first-stage waste heat recovery system to produce steam of 4 MPa at a rate of 11.6 t/h for output;

(2) entering the tail gas at 335° C. into the denitrification system and denitrifying with 5-15% aqueous ammonia, where after adequate reaction on the surface of the denitrification catalyst in the denitrification reactor, the nitrogen oxide content is decreased to 35 mg/$Nm^3$, and the denitrification rate is 90%.

(3) after the treatment in the denitrification system, entering the tail gas into the second-stage waste heat recovery system via a tail gas vent, where steam of 0.6 MPa is produced at 3.3 t/h as a by-product, and the temperature of the tail gas is reduced to 166° C. in the second-stage waste heat recovery system;

(4) after the treatment in the second-stage waste heat recovery system, entering the discharged FCC tail gas into the dedusting tower for dust removal and into the absorption tower for desulfurization, where the solid-containing washing liquid obtained in the dedusting tower is fed to a filtering system for solid removal, and the washing liquid removed of the solid is recycled for washing the FCC tail gas; and the FCC tail gas entering the absorption tower is desulfurized with 5-15% aqueous ammonia; and (5) after the desulfurization, discharging the cleaned tail gas via the tail gas exhaust system, where the $NO_x$ content is 35 mg/$Nm^3$, the $SO_2$ content is 38 mg/$Nm^3$, the dust level is 11.5 mg/$Nm^3$ in a normal case and is 21 mg/$Nm^3$ under the operating condition of catalyst loss; the 40% ammonium sulfate solution produced as a by-product at about 4.7 t/h is evaporated and recrystallized, vortexed, separated by centrifugation, dried, and packaged, to obtain a finished product ammonium sulfate at 1.89 t/h, the quality of which (nitrogen content: 21.05%, water content: 0.2%, and free acid content: 0.03%) meets the requirements for ammonium sulfate of the first grade as specified by GB535-1995.

Illustrative analytical methods and instruments for detecting various indices in the Example is shown in Table 1. The parameters of main raw materials and the product are shown in Table 2.

TABLE 1

List of the methods and main instruments for detecting various indices

| Item No. monitored | Standard analytical method and code | Instrument and model | Instrument # |
|---|---|---|---|
| 1 Flue dust | Determination of particulates and sampling methods of gaseous pollutants emitted from exhaust gas of stationary source GB/T16157-1996 | Laoying 3012H model flue dust sampling instrument Electronic balance BS2245, AB204-S | 8042448, 08244496 18360886, 1119051201 |
| 2 $SO_2$ | Determination of sulphur dioxide from exhausted gas of stationary source: fixed-potential electrolysis HJ/T 57-2000 | Testo 350 flue gas analytical instrument | 10#, 1# |
| 3 $NO_x$ | Determination of nitrogen dioxide from exhausted gas of stationary source: fixed-potential electrolysis HJ/T 693-2014 | Testo 350 flue gas analytical instrument | 10#, 1# |
| 4 Ammonia | Ambient air and exhaust gas-Determination of ammonia-Nessler's reagent spectrophotometry HJ 533-2009 | Laoying 3072H model 722 spectrophotometer | 02085809, 2c5BP363 |
| 5 Oxygen content in the flue gas | Electrochemical method-Specifications and test procedures for continuous emission monitoring systems of flue gas emitted from stationary sources (Appendix B) (HJ/T 76-2007) | Testo 350 flue gas analytical instrument | 10#, 1# |
| 6 Temperature of the flue gas | Platinum resistor method Determination of particulates and sampling methods of gaseous pollutants emitted from exhaust gas of stationary source (GB/T 16157-1996) | TES-1310 | / |
| 7 Humidity of the flue gas | Specifications and test procedures for continuous emission monitoring systems of flue gas emitted from stationary sources (Appendix B) (HJ/T 76-2007) | Laoying 3012H model flue dust sampling instrument | 8042448, 08244496 |
| 8 Ammonium sulfate | Ammonium sulfate (GB 535-1995) known laboratory instruments | Analytical balance, PH meter and other | |

TABLE 2

Parameters of main raw materials and the product

| No. | Technic index | Unit | Value |
|---|---|---|---|
| 1 | Flow rate of FCC tail gas | $Nm^3/h$ | 262000 |
| 2 | Temperature of the flue gas at the inlet | ° C. | 600-650 |
| 3 | $NO_x$ concentration in the flue gas | $mg/Nm^3$ | 350 |
| 4 | $SO_2$ concentration in the flue gas | $mg/Nm^3$ | 3550 |
| 5 | Dust level in the flue gas | $mg/Nm^3$ | 200 |
| 6 | $NO_x$ concentration in the flue gas at the outlet | $mg/Nm^3$ | 35 |
| 7 | $SO_2$ concentration in the flue gas at the outlet | $mg/Nm^3$ | 38 |
| 8 | Dust level in the flue gas at the outlet | $mg/Nm^3$ | Normal case: 11.5; Operating condition of catalyst loss: 21 |
| 9 | Absorption temperature | ° C. | 52-54 |
| 10 | Ammonia recovery rate | % | 98.9 |
| 11 | Quality of the product ammonium sulfate | | GB535: first grade |

The desulfurization efficiency in the Example is 98.9%, and the denitrification efficiency is 90%. The denitrification efficiency is ≥90%, the desulfurization efficiency is 98.9%, the $NO_x$ concentration in the cleaned tail gas is 35 $mg/Nm^3$, the $SO_2$ concentration is 38 $mg/Nm^3$, the dust level is 11.5 $mg/Nm^3$, and the nitrogen content in the by-product ammonium sulfate is 21.06%. Normal performance can be achieved under the operating condition of catalyst loss.

Comparative Example

CN104941423A is taken as a Comparative Example, in which the tail gas of 100,0000 tons/year produced during the catalyst regeneration of a catalytic cracking unit is treated, where the flow rate of the tail gas is 135000 $Nm^3/h$, the temperature is 950° C., the moisture content is 12%, the nitrogen oxide concentration is 360 $mg/Nm^3$, the sulfur dioxide concentration is 2300 $mg/Nm^3$, the dust level is 150 $mg/Nm^3$, and the desulphurizing agent is 99.6% liquid ammonia. In a normal case, the denitrification efficiency is ≥88.9%, the desulfurization efficiency is 98.5%, the $NO_x$ concentration in the cleaned tail gas is 38 $mg/Nm^3$, the $SO_2$ concentration is 32 $mg/Nm^3$, the dust level is lower than 15 $mg/Nm^3$, and the nitrogen content in the by-product ammonium sulfate is 20.8%.

However, the operating condition of catalyst loss is not taken into consideration and the following effects are obtained.

A large amount of dust enters the absorption liquid, such that the content of insoluble solid in the absorption liquid rises to 3% or higher. This causes the product ammonium sulfate to fail to be recrystallized and discharged. Even if the product ammonium sulfate could be discharged, the N content in the product would be decreased to 18% or below, and thus the product cannot be marketed. Moreover, the absorption circulation pump is clogged and worn, and the apparatus needs to be shut down to clean up the accumulated solids in the absorption tower. Dust level in the exhaust is 21 $mg/Nm^3$.

The present disclosure illustrates principles of the invention and is not intended to limit the invention to the particular embodiments illustrated. All patents, patent applications, scientific papers, and any other referenced materials mentioned herein are incorporated by reference in their entirety. The principles of the invention encompass any possible combination of some or all of the various embodiments mentioned herein, described herein and/or incorporated herein. The principles of the invention encompass any possible combination that also specifically excludes any one or some of the various embodiments mentioned herein, described herein and/or incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7), and to each number 1, 2, 3, 4, 5, 6, 7, 8, 9, and 10 contained within the range. All percentages, ratios and proportions herein are by weight unless otherwise specified.

Thus, apparatus and methods for for using ammonia to treat fluid catalytic cracking tail-gas have been provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for using ammonia to treat fluid catalytic cracking tail-gas, the apparatus comprising:
   a flow-through heat-exchanger in thermal communication with a flow that includes the tail-gas, the heat exchanger including a liquid coolant that is materially isolated from the flow;
   downstream, along the flow, from the heat-exchanger, a dust-removal vessel that includes a washing-liquid spray layer configured to spray washing liquid against the flow to remove dust from the flow;
   downstream from the dust-removal vessel, a sulfur dioxide absorption vessel that supports a liquid circuit configured to:
      provide an ammonia-bearing liquid to a sprayer that is directed against the flow; and
      recirculate the liquid, after passing through the sprayer, to the sprayer; and
   a denitrification system configured to remove nitrogen oxides from the flow, the denitrification system disposed upstream along the flow, from the heat exchanger, and upstream from the dust-removal vessel;
   the dust-removal vessel further comprising, transverse to the flow:
      a demister,
      first sprayers in a first washing-liquid spray layer; and,
      below the first layer, second sprayers in a second washing-liquid spray layer;
      wherein the sprayers are configured to direct washing-liquid against the flow.

2. The apparatus of claim 1 wherein the sulfur dioxide absorption vessel includes a desulfurization tower that includes:
   a sulfur dioxide absorption section; and,
   downstream from the sulfur dioxide absorption section, a fine particulate removal section.

3. The apparatus of claim 2 wherein the fine particulate removal section includes:
   a washing layer including:
      first fine particulate removal sprayers configured to spray recycled dilute ammonium sulfate solution against the flow;

downstream from the first fine particulate removal sprayers, second fine particulate removal sprayers configured to spray recycled dilute ammonium sulfate solution against the flow; and downstream from the washing layer:
a first fine particulate removal demister; and
downstream from the first fine particulate removal demister, a second fine particulate removal demister.

4. The apparatus of claim 3 wherein, in operation, a ratio of sprayed solution to flow gas in a region between the first fine particulate removal sprayers and the second fine particulate removal sprayers is not less than 1.1 L/m$^3$.

5. The apparatus of claim 4 wherein, in operation, a spray coverage rate of the first fine particulate removal sprayers is not less than 120%.

6. The apparatus of claim 5 wherein the spray coverage rate is not less than 300%.

7. The apparatus of claim 1 wherein the sulfur dioxide absorption vessel does not have a flow-cooling section.

8. The apparatus of claim 1 wherein the denitrification system includes a selective catalytic reduction reactor that has:
an ammonia injection grid at an inlet for the flow; and
a flow rectifier configured to rectify the flow.

9. The apparatus of claim 1 wherein:
the first washing-liquid spray layer is configured to dispense washing-liquid such that between the first and second washing-liquid layers, washing-liquid is sprayed at a rate of 1.1 L washing-liquid per m$^3$ flow moving up the dust-removal vessel;
the first washing-liquid spray layer is configured to provide a spray coverage rate that is not less than 120%; and
a total spray coverage rate of washing-liquid spray layers in the dust-removal vessel is not less than 200%.

10. The apparatus of claim 2 wherein:
the sulfur dioxide absorption vessel includes 2 to 4 layers of sprayers;
a liquid to gas ratio between each layer of the layers is a ratio that is not less than 1.1 L/m$^3$;
a spray coverage rate is not less than 120%; and
a total spray coverage rate of the tower is not less than 300%.

11. An apparatus for using ammonia to treat fluid catalytic cracking tail-gas, the apparatus comprising:
a flow-through heat-exchanger in thermal communication with a flow that includes the tail-gas, the heat exchanger including a liquid coolant that is materially isolated from the flow;
downstream, along the flow, from the heat-exchanger, a dust-removal vessel that includes a washing-liquid spray layer configured to spray washing liquid against the flow to remove dust from the flow;
downstream from the dust-removal vessel, a sulfur dioxide absorption vessel that supports a liquid circuit configured to:
provide an ammonia-bearing liquid to a sprayer that is directed against the flow; and
recirculate the liquid, after passing through the sprayer, to the sprayer;
a denitrification system configured to remove nitrogen oxides from the flow, the denitrification system disposed downstream along the flow, from the heat exchanger, and upstream from the dust-removal vessel;

the dust-removal vessel further comprising, transverse to the flow:
a demister,
first sprayers in a first washing-liquid spray layer; and, below the first layer, second sprayers in a second washing-liquid spray layer;
wherein the sprayers are configured to direct washing-liquid against the flow; and
an ammonium sulfate reclamation system having an evaporator configured to dewater ammonium sulfate slurry in feed that is generated by the sulfur dioxide absorption vessel.

12. The apparatus of claim 11 wherein the reclamation system is configured to pass the slurry through a cyclone.

13. The apparatus of claim 11 wherein the reclamation system is configured to pass the slurry through a centrifuge.

14. The apparatus of claim 11 wherein the reclamation system is configured to pass the slurry through a dryer.

15. The apparatus of claim 11 wherein the reclamation system is configured to pass the slurry to a packaging machine.

16. The apparatus of claim 11 wherein the reclamation system passes the slurry, in order, through a cyclone, a centrifuge, a dryer, and a packaging machine.

17. The apparatus of claim 11 wherein the sulfur dioxide absorption vessel includes a desulfurization tower that includes:
a sulfur dioxide absorption section; and,
downstream from the sulfur dioxide absorption section, a fine particulate removal section.

18. The apparatus of claim 17 wherein the fine particulate removal section includes:
a washing layer including:
first fine particulate removal sprayers configured to spray recycled dilute ammonium sulfate solution against the flow;
downstream from the first fine particulate removal sprayers, second fine particulate removal sprayers configured to spray recycled dilute ammonium sulfate solution against the flow; and
downstream from the washing layer:
a first fine particulate removal demister; and
downstream from the first fine particulate removal demister, a second fine particulate removal demister.

19. The apparatus of claim 18 wherein, in operation, a ratio of sprayed solution to flow gas in a region between the first fine particulate removal sprayers and the second fine particulate removal sprayers is not less than 1.1 L/m$^3$.

20. The apparatus of claim 19 wherein, in operation, a spray coverage rate of the first fine particulate removal sprayers is not less than 120%.

21. The apparatus of claim 20 wherein the spray coverage rate is not less than 300%.

22. The apparatus of claim 11 wherein the sulfur dioxide absorption-vessel does not have a flow-cooling section.

23. The apparatus of claim 11 wherein the denitrification system includes a selective catalytic reduction reactor that has:
an ammonia injection grid at an inlet for the flow; and
a flow rectifier configured to rectify the flow.

24. The apparatus of claim 11 wherein:
the first washing-liquid spray layer is configured to dispense washing-liquid such that between the first and second washing-liquid layers, washing-liquid is sprayed at a rate of 1.1 L washing-liquid per m$^3$ flow moving up the dust-removal vessel;

the first washing-liquid spray layer is configured to provide a spray, coverage rate that is not less than 120%; and the total spray coverage rate of washing-liquid spray layers in the dust-removal vessel is not less than 200%.

25. An apparatus for using ammonia to treat fluid catalytic cracking tail-gas, the apparatus comprising:

a flow-through heat-exchanger in thermal communication with a flow that includes the tail-gas, the heat exchanger including a first liquid coolant that is materially isolated from the flow;

downstream, along the flow, from the heat-exchanger, a dust-removal vessel that includes a washing-liquid spray layer configured to spray washing liquid against the flow to remove dust from the flow;

downstream from the dust-removal vessel, a sulfur dioxide absorption vessel that supports a liquid circuit configured to:

provide an ammonia-bearing liquid to a sprayer that is directed against the flow; and recirculate the liquid, after passing through the sprayer, to the sprayer;

a denitrification system configured to remove nitrogen oxides from the flow, the denitrification system disposed downstream along the flow, from the heat exchanger, and upstream from the dust-removal vessel;

the dust-removal vessel further comprising, transverse to the flow:

a demister, first sprayers in a first washing-liquid spray layer; and, below the first layer, second sprayers in a second washing-liquid spray layer;

wherein the sprayers are configured to direct washing-liquid against the flow; and a waste-heat recovery system that is:

disposed downstream from the denitrification system and upstream from the dust-removal vessel;

configured to remove heat from the flow; and includes a second liquid coolant that is materially isolated from the flow.

26. The apparatus of claim 25 wherein the demister includes a baffle-type demister.

27. The apparatus of claim 25 wherein the demister includes a roof-ridge type demister.

28. The apparatus of claim 25 wherein the demister includes a wire mesh type demister.

29. The apparatus of claim 25 wherein the denitrification system includes a selective catalytic reduction reactor that has:

an ammonia injection grid at an inlet for the flow; and a flow rectifier configured to rectify the flow.

30. The apparatus of claim 25 wherein:

the sulfur dioxide absorption vessel includes 2 to 4 layers of sprayers;

a liquid to gas ratio between each layer of the layers is a ratio that is not less than 1.1 $L/m^3$;

a spray coverage rate is not less than 120%; and a total spray coverage rate of the absorption vessel is not less than 300%.

* * * * *